United States Patent [19]

Verhelst et al.

[11] Patent Number: 5,278,274
[45] Date of Patent: Jan. 11, 1994

[54] CHEMICAL PROCESS

[75] Inventors: Gabriel Verhelst, Herent; Louis Muller, Ottenburg; Alain Parfondry, Brussels, all of Belgium

[73] Assignee: Imperial Chemical Industries plc, London, England

[21] Appl. No.: 774,768

[22] Filed: Oct. 10, 1991

[30] Foreign Application Priority Data

Oct. 12, 1990 [GB] United Kingdom ............... 9022184
Oct. 12, 1990 [GB] United Kingdom ............... 9022185

[51] Int. Cl.$^5$ ............................................. C08G 18/00
[52] U.S. Cl. .................................... 528/44; 528/49; 528/50; 528/62; 528/65; 528/75; 521/88; 521/89
[58] Field of Search ............... 528/44, 49, 56, 62, 528/65, 75; 521/88, 89

[56] References Cited

U.S. PATENT DOCUMENTS

| | | |
|---|---|---|
| 3,654,370 | 4/1972 | Yeakey . |
| 3,789,045 | 1/1974 | Coury . |
| 4,214,965 | 7/1980 | Rowe ................................. 522/139 |
| 4,234,693 | 11/1980 | Wooler . |
| 4,297,444 | 10/1981 | Gilbert et al. . |
| 4,478,960 | 10/1984 | Buethe et al. ...................... 521/160 |
| 4,487,908 | 12/1984 | Dominquez . |
| 4,487,912 | 12/1984 | Zimmerman et al. . |
| 4,499,254 | 2/1985 | Dominguez et al. . |
| 4,552,903 | 11/1985 | Nafziger et al. .................... 521/137 |
| 4,608,397 | 8/1986 | Reischl . |
| 4,668,708 | 5/1987 | Mueller et al. . |
| 4,940,750 | 7/1990 | Rosthauser et al. ................ 528/44 |
| 4,945,117 | 7/1990 | Gansen et al. ...................... 521/99 |
| 5,037,864 | 8/1991 | Anand et al. ....................... 524/839 |

FOREIGN PATENT DOCUMENTS

| | | |
|---|---|---|
| 0005903 | 12/1979 | European Pat. Off. . |
| 0022617 | 1/1981 | European Pat. Off. . |
| 0103996 | 3/1984 | European Pat. Off. . |
| 0351852 | 1/1990 | European Pat. Off. . |
| 0353061 | 1/1990 | European Pat. Off. . |
| 0361418 | 4/1990 | European Pat. Off. . |
| 0237177 | 7/1986 | Fed. Rep. of Germany . |
| 2187836 | 1/1974 | France . |
| 53-128714 | 10/1978 | Japan . |
| 0874430 | 8/1961 | United Kingdom . |

OTHER PUBLICATIONS

Derwent Publication AN 89-211513 (corresponding to JPA 1 149 817 published Jun. 12, 1989).

Primary Examiner—John Kight, III
Assistant Examiner—Duc Truong

[57] ABSTRACT

A continuous process for the preparation of an isocyanate-terminated prepolymer having an NCO content in the range from 2 to 15% by weight, said process comprising the steps of:

(A) continuously delivering to a reaction zone an organic polyisocyanate composition and an isocyanate reactive compound having an average molecular weight of at least 1000 the relative proportions of isocyanate composition and isocyanate reactive compound being appropriate for the formation of a prepolymer having an NCO content in the indicated range;

(B) allowing the isocyanate composition and the isocyanate reactive compound to react in the reaction zone to form an isocyanate-terminated prepolymer, and (C) continuously removing the prepolymer from the reaction zone.

14 Claims, No Drawings

CHEMICAL PROCESS

This invention relates to a chemical process and more particularly to a continuous process for the production of isocyanate-containing polyurethane prepolymers useful in the production of polyurethane articles.

Isocyanate-containing polyurethane prepolymers obtained by reacting a stoichiometric excess of an organic polyisocyanate with an organic polyol are well known in the field of polyurethanes and have been used, for example, in the production of solid and microcellular elastomers, flexible and rigid foams, coatings, adhesives and the like. Thus, essentially difunctional prepolymers having low free isocyanate contents obtained by reacting tolylene diisocyanate (TDI) or diphenylmethane diisocyanate (MDI) with a polyester or polyether diol have been used in the preparation of elastomers. On the other hand, prepolymers having high free isocyanate contents obtained by reacting various diols with 4,4'-diphenylmethane diisocyanate have been manufactured as a means of providing this normally solid diisocyanate in a convenient liquid form.

The conventional method of making prepolymers is to react the polyol and polyisocyanate batchwise at an elevated temperature, the reactants being used in appropriate proportions to provide a prepolymer of the desired free isocyanate content. The reaction between the polyol and the polyisocyanate is exothermic but, in order to achieve completion in an acceptable time, it is usual to heat the reaction mixture to a temperature in the range from about 40° to about 100° C. for one hour or longer. It has also been proposed to employ catalysts to bring about prepolymer formation.

European Patent Application 351852 is disclosing a method for preparing a foam by combining a polyol and a polyisocyanate in such a way that they do not react and to bring this combination into contact with the other ingredients necessary for preparing the foam.

The present invention comprises a continuous process for the preparation of an isocyanate-terminated polyurethane prepolymer having an NCO content in the range from 2 to 15% by weight, said process comprising the steps of:

(A) continuously delivering to a reaction zone an organic polyisocyanate composition, an isocyanate reactive compound having a molecular weight of at least 1000 and optionally a catalyst, the relative proportions of isocyanate composition and isocyanate reactive compound being appropriate for the formation of a prepolymer having an NCO content in the indicated range;

(B) allowing the isocyanate composition and the isocyanate reactive compound to react in the reaction zone to form an isocyanate-terminated prepolymer, and (C) continuously removing the prepolymer from the reaction zone.

Suitable organic polyisocyanates include aliphatic, cycloaliphatic, araliphatic and aromatic polyisocyanates, for example 1,6-hexamethylene diisocyanate, isophorone diisocyanate, cyclohexane-1,4- diisocyanate, 4,4'-dicyclohexylmethane diisocyanate, p-xylylene diisocyanate and phenylene diisocyanates, but especially those aromatic polyisocyanates conventionally used in the manufacture of polyurethane foams. Of particular importance are the tolylene diisocyanates (TDI) and diphenylmethane diisocyanates (MDI) in their various pure, modified and crude forms and mixtures thereof.

Suitable isocyanates include "pure" MDI preferably containing at least 60% by weight of 4,4'-isomer. Other suitable isocyanates include the substantially pure 4,4'-isomer and isomer mixtures containing that isomer and not more than 40%, preferably not more than 30%, and more preferably not more than 20%, by weight of the 2,4'-isomer and not more than 5% by weight of the 2,2'isomer. Still other suitable isocyanate compositions include modified forms of diphenylmethane diisocyanates, that is to say MDI modified in known manner by the introduction of urethane, allophanate, urea, biuret, carbodiimide, uretonimine or isocyanurate residues. These so-called MDI variants particularly include uretonimine-modified MDI having NCO contents of at least 25% by weight and polyether-based prepolymers having NCO contents of at least 20% by weight.

Isocyanate compositions containing MDI and polymeric fillers may also be used in the preparation of the prepolymer. Such products include polyurea dispersions in MDI such as have been described, for example, in EP-A-0 103996.

Other compositions containing polymeric fillers include prepolymers based on MDI and polymer polyols containing dispersed polymer particles. In these products, it is generally preferred that the dispersed polymer particles have an average size of less than 50 microns.

Further isocyanate compositions which may be used in the preparation of the prepolymer include compositions containing polymethylene polyphenylene polyisocyanates. Thus, mixtures may be used containing at least 70% by weight of pure MDI isomers and up to 30% by weight of the so-called crude MDI containing from 35 to 65% by weight of diisocyanates, the remainder being largely polymethylene polyphenylene polyisocyanates having isocyanate functionalities greater than 2. Mixtures may also be used of pure MDI and polymeric MDI compositions containing higher proportions (up to 100%) of the said higher functionality polyisocyanates.

Suitable isocyanate-reactive compounds for the process of the present invention include polyols, thiols, polyamines, imino-compounds, enamine-containing compounds and mixtures thereof.

Typical compounds have molecular weights of at least 1000, preferably 2000-8000 and a functionality ranging from 1.1 to 5, preferably 2-4, more preferably 2-3.

Particularly important isocyanate-reactive polymers include polymeric polyols. Suitable polyols and methods for their preparation have been described in the prior art and, as example of such polyols, there may be mentioned polyesters, polyesteramides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other particularly useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4- butanediol, neopentyl glycol, 1,6-hexanediol, cyclohexane dimethanol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric an adipic acids or their dimethyl esters, sebasic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals. Suitable polyolefin polyols include hydroxy-terminated butadiene homo- and copolymers and suitable polysiloxane polyols include polydimethylsiloxane diols and triols.

Other polyols which may be used comprise dispersions or solutions of addition or condensation polymers in polyols of the types described above. Such modified polyols have been fully described in the prior art and include products obtained by the in situ polymerisation of one or more vinyl monomers, for example styrene and acrylonitrile, in polymeric polyols, for example polyether polyols or by the in situ reaction between a polyisocyanate and an amino-functional compound and/or low MW polyhydroxyls and/or amino-alcohols in a polymeric polyol.

Other useful isocyanate-reactive polymers include polymeric polyamines, especially diamines and triamines, corresponding to the above described polymeric polyols. Suitable polyamines include products obtained by the reductive amination of polyether polyols as described, for example, in U.S. Pat. No. 3,654,370 or by the cyanoethylation of polyols followed by hydrogenation. Polyoxypropylene diamines and triamines and mixtures thereof are preferred. Also useful are polymers containing both amino and hydroxyl groups obtained by the partial amination of polyols.

Imino-functional compounds which may be used are imino-functional compounds capable of reacting directly with polyisocyanates without prior cleavage of the C=N bond to form a monomeric byproduct. Suitable imino-functional compounds include imino-functional polyether resins. "Imino-functional" as used herein means that a reactant contains the grouping:

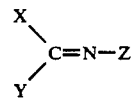

wherein X, Y and Z are chemical moieties which collectively form the rest of said compound and are each independently selected from hydrogen and organic radicals which are attached to the imino unit:

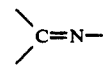

of said compound through N, C, O, S, Si or P, the central carbon atom of said imino unit being bonded to three atoms.

In the above structure, neither the carbon nor the nitrogen atom of the imino unit should be incorporated within an aromatic or other fully conjugated ring or ring system. It is preferred that Z is attached to the imino unit through saturated atoms, preferably aliphatic carbon atoms.

The range of imino-functional reagents which may be used in the invention is not limited by or to any particular chemistry of the preparation of said reagents. For example, imine terminated aliphatic polyethers may be made by a number of different routes. Specifically, the amine groups (—NH$_2$) of an aliphatic amine-terminated polyether can be prereacted with an aldehyde (XCH$_2$CHO) or a ketone (X—CO—Y), to form, respectively, the corresponding aldimine

—N=CHCH$_2$X or the corresponding ketimine

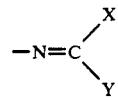

or the aldehyde and/or ketone group of an aldehyde and/or ketone-terminated polyether, can be prereacted with an aliphatic primary mono-amine to form, respectively, the corresponding aldimine and/or ketimine-terminated polyethers:

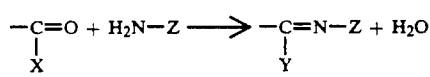

The preparation of imino functional groups in both cyclic and acyclic forms is well known in the literature, such as from "The Chemistry of the Carbon-Nitrogen Double Bond", Ed. S. Patai, Interscience Publishers, London, 1970 and references therein.

Enamine-containing compounds which may be present include compounds having the structures:

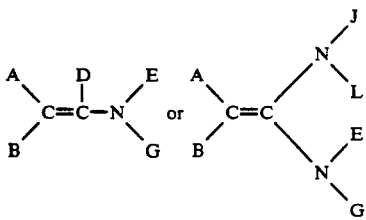

wherein each of A, B, D, E, G, J and L, independently, represents hydrogen or, preferably, an optionally substituted hydrocarbon radical, any of A, B and D and, independently, any of E, G, J and L optionally being joined together to form one ore more carbocyclic or heterocyclic rings.

In many preferred enamine-functional compounds E, G, J and L are not hydrogen. It is also preferred that not both of A and B are hydrogen. Especially useful enamino-functional compounds contain two or more enamine groups as a result of any of A, B, D, E, G, J and/or L being a radical terminating in one or more enamino groups.

Suitable enamino-functional compounds may be obtained in known manner by reacting a carbonyl compound containing at least one alpha-hydrogen atom, for example an aliphatic, cyclo-aliphatic or araliphatic aldehyde or ketone such as acetaldehyde, propionaldehyde, isobutyraldehyde, caproaldehyde, cyclohexylaldehyde, acetone, methyl ethyl ketone, benzyl methyl ketone, cyclopentanone, cyclohexanone, trimethylcyclohexanone, mixtures of these and the like with a secondary amine, for example a secondary amino-terminated polymer such as a polyether.

Mixtures of isocyanate-reactive polymers may be used. Such mixtures may contain components differing in respect of molecular weight, functionality, nature of isocyanate-reactive groups or polymer backbone. Depending on the specific isocyanate reactive compounds used in the process of the present invention, the use of catalysts may be preferred or not.

Using polyols as isocyanate reactive compounds, it is preferred to use catalysts for urethane formation.

Catalysts for urethane formation which may be used are compounds which promote reaction between isocyanate and hydroxyl groups. Such catalysts have been fully described in the prior art (for example in Saunders and Frisch, Polyurethanes: Chemistry and Technology, Part I, Interscience, New York, 1962, pages 161–173) and include organic and inorganic salts of, and organo-metallic derivatives of, bismuth, lead, tin, iron, antimony, cadmium, cobalt, aluminium, mercury, zinc, nickel, cerium, molybdenum, vanadium, copper, manganese and zirconium, as well as phosphines and tertiary amines.

One particularly important class of catalysts comprises tin salts and organotin salts, for example stannous acetate, stannous butyrate, stannous octoate, stannous laurate, stannous oleate, stannous stearate, dibutyltin diacetate, dibutyltin dilaurate, dibutyltin mercaptopropionate and the like.

Another important class of catalysts comprises tertiary amines in which the nitrogen atom is not directly attached to an aromatic ring. As examples of tertiary amine catalysts, there may be mentioned triethylamine, N, N, N', N'-tetramethylenediamine, N-N,N',N'-tetramethyl-1,3- butanediamine, bis-2-dimethylaminoethyl ether, N,N-dimethylcyclohexylamine, N,N-dimethyl-benzylamine, N-methylmorpholine, N-ethylmorpholine, 1,4-diazabicyclo-[2.2.2] octane and the like. Polyols containing tertiary amino groups, for example polyethers obtained by the oxyalkylation of ammonia or triethanolamine, may be self-catalytic and may, in some cases, be reacted with the diisocyanate composition in the absence of additional catalyst.

Combinations of one or more metal salts or complexes with one or more tertiary amines provide especially effective catalysts.

Using polyamines as isocyanate reactive compounds, it may be preferred not to use catalysts, although the use of catalysts, such as carboxylic acid catalysts, or any other known catalysts, is possible. A group of catalysts which is more specific for the reaction of isocyanates with aliphatic imines or enamines includes carboxylic acids and precursors thereof (such as acid anhydrides), but the use of organotin catalysts, tertiary amines and combinations of organotin catalysts and tertiary amines is also possible. Specific examples of carboxylic acid catalysts include oleic acid, 1,12-dodecanedioic acid, isophthalic acid, and the like. These types of catalysts are described in U.S. Pat. Nos. 4,499,254; 4,487,908; and 4,487,912; and in U.S. Pat. No. 3,789,045 (for the imine-isocyanate reaction.)

In general, it is undesirable for the prepolymer to contain more catalyst than is required in subsequent processing, for example foam production, although the possibility of "killing" excess catalyst in known manner is not excluded. If desired or necessary, the catalyst may be introduced into the reaction zone in the form of a solution in a inert solvent.

Persons skilled in the art, knowing the isocyanate content of the isocyanate composition and the functionality and molecular weight of the isocyanate-reactive compound, will have no difficulty in calculating the relative amounts of these reactants to be delivered to the reaction zone in order to provide a prepolymer having any desired NCO content. To achieve a final NCO content within the range 2 to 15% by weight, an initial ratio of isocyanate to isocyanate-reactive groups would typically be within the range from about 3:1 to about 20:1. Preferred prepolymers are made by reacting the starting materials at an initial ratio of isocyanate to isocyanate-reactive groups in the range from 3.5:1 to 15:1, especially 4:1 to 10.1 to give prepolymers having NCO contents of 4 to 12%, especially 5 to 10% by weight.

The configuration of the reaction zone used in the method of the invention is not important, any conventional equipment of appropriate size being suitable. Similarly, conventional equipment and techniques may be used for delivering the isocyanate composition, the isocyanate-reactive compound and optionally the catalyst, to the reaction zone and removing the prepolymer therefrom.

In general, it is preferred to react the isocyanate composition and the isocyanate-reactive compound at or close to the ambient temperature no heat being applied to the reactants or to the reaction mixture other than to liquefy any reactants, for example 4,4'-MDI, which may be solid at the ambient temperature. In fact, cooling facilities may be required when the prepolymer is to be immediately subjected to further processing.

If heat is to be applied it is preferred to preheat the reactants up to at most 80° C. and not to apply heat further down-stream in the process.

The prepolymers prepared by the method of the invention are liquid compositions having low vapour pressures. They may be used in the production of polyurethane materials and are particularly suitable for use in the manufacture of flexible foams, especially cold-curing, low density flexible foams having high resilience combined with excellent tear and tensile properties. To effect foam formation, the isocyanate-terminated prepolymer is reacted with water in the presence as necessary of conventional additives. Such additives include catalysts, for example the tertiary amines and tin compounds described above, surface-active agents and foam stabilisers, for example siloxane-oxyalkylene copolymers, chain extenders, for example low molecular weight diols, diamines and di-imines, crosslinking agents, for example triethanolamine, flame retardants, organic and inorganic fillers, pigments and internal mould release agents. Moulded or slabstock foam may be prepared from the prepolymers using continuous or discontinuous production techniques. The prepolymer preparation and the foam-forming process may be linked in such a way that the whole process can be carried out continuously. For all these ways of production the prepolymer may be stored in a tank wherein the prepolymer may be allowed to mature under appropriate conditions. In case of a process wherein the prepolymer process and the foam-forming process are linked in such a way that the whole process is carried out continuously such a tank should provide for a residence time of the prepolymer, which time is sufficient to give the prepolymer the desired maturity.

The method of the invention is particularly easily adapted to the production of foam. Thus, in a preferred embodiment of the invention, there is provided a method for the production of flexible foams comprising the steps of:

(A) continuously delivering to a reaction zone an organic polyisocyanate composition, an isocyanate-reactive compound having an average molecular weight of at least 1000 and optionally a catalyst, the relative proportions of isocyanate composition and isocyanate-reactive compound being appropriate for the formation of a prepolymer having an NCO content in the range from 2 to 15% by weight;

(B) allowing the isocyanate composition and the isocyanate-reactive compound to react in the reaction zone to form an isocyanate-terminated prepolymer;

(C) continuously removing the prepolymer away from the reaction zone;

(D) delivering the prepolymer to a foam-forming zone;

(E) reacting the prepolymer in the foam-forming zone with an isocyanate-reactive component, and (F) recovering the foam so formed.

In operating the method for the production of foam, cooling of the prepolymer, for example to the ambient temperature, may be effected during transfer from the reaction zone to the foam-forming zone if desired. The foam-forming zone typically comprises conventional equipment, for example a conventional mixing head, used for foam production.

According to a particular embodiment of the process of the invention, the prepolymer is prepared by mixing the appropriate components as described above in an equipment which is the same to the one used for the formation of the polyurethane foam. This means that the same mixing head is used for the prepolymer formation and the foam forming reaction. In order to achieve this the following measures are taken 1) the prepolymer is continuously removed from the reaction zone and continuously delivered to a storage tank;
2) once the desired amount of prepolymer has been produced the feeds to the reaction zone are closed as well as the feed from the reaction zone to the prepolymer storage tank;
3) subsequently the feed from the prepolymer storage tank to the same reaction zone and the feeds from the storage tanks holding the other ingredients used for preparing the foams are opened; and
4) flexible foam is allowed to be formed in the same reaction zone and recovered. The device may, if desired, be cleaned after step 2) and 4).

Once sufficient foam has been made the device may be used again for preparing the prepolymer.

The use of the same reaction zone for the prepolymer formation and the flexible foam preparation provides the advantage that the foam producer does not need to install a separate reactor for the preparation of the prepolymer. Hence, a more economic use of the flexible foam reactor is possible. In particular for slab-stock flexible foam machines, which often are only used for 1–4 days a week, this provides for a considerable saving: when no foam is made the prepolymer may be prepared.

In a preferred embodiment the prepolymer may be reacted with an isocyanate reactive component comprising at least 40% by weight of water, the rest of it being chain extenders, crosslinkers or conventional additives and less than 5% by weight based on the isocyanate reactive component, of a conventional polyol used for the formation of polyurethane foams. Typically a water content of at least 95% by weight may be achieved.

In addition, there may also be delivered to the foam-forming zone one or more of the additives known per se in foam production, such additives having been described above. It is preferred, however, that the foam-forming reaction mixture is substantially free of halocarbon blowing agent, that is to say that the foam formulation should contain less than 1%, preferably less than 0.5% of halocarbon blowing agent, for example trichlorofluoromethane so that less than 10% of the blowing is due to the halocarbon.

In a particularly preferred method of making foam, a second isocyanate composition is delivered to the foam-forming zone in addition to the prepolymer. Isocyanate compositions which may be used in conjunction with the isocyanate-terminated prepolymer include the various types of diphenylmethane diisocyanate compositions described above in relation to the preparation of the prepolymer provided they are liquids at the operating temperature. Thus, suitable compositions include MDI isomer mixtures, preferably containing at least 60% by weight of the 4,4'-isomer, MDI variants and crude or polymeric MDI. It is preferred that the second diphenylmethane diisocyanate composition has an NCO content of at least 25%, especially at least 30% by weight.

In especially preferred foam formulations, the prepolymer is obtained from a diphenylmethane diisocyanate composition and is used in conjunction with a second diphenylmethane diisocyanate composition having an NCO content of at least 25% by weight, the weight ratio of prepolymer to second MDI composition being in the range from 2.3:1 to 100:1, the prepolymer and second MDI composition together containing from 20 to 40% by weight of methylene-bridged polyphenyl poly-isocyanates or reacted residues thereof and from 80 to 60% byweight of reacted residues of isocyanate-reactive species. Most preferably the isocyanate reactive component comprises at least 95% of water and the weight ratio of prepolymer and second MDI species to aqueous isocyanate-reactive component is in the range from 100:10 to 100:1.

The present invention is illustrated by the following examples.

EXAMPLE 1

An isocyanate-terminated prepolymer was prepared continuously by feeding MDI, comprising 80% 4,4'-MDI and 20% 2,4'-MDI, which was preheated at 54° C. at a speed of 11.35 Kg/min and Caradol 36.3 (a commercially obtainable glycerol initiated polyol having a hydroxyl value of 36 and 13% EO tipping) which was preheated at 42° C. at a speed of 34 Kg/min to a Viking TC 1167 slabstock machine. The weight ratio of the polyol and the polyisocyanate was 75:25. The mixing speed was 3000 rpm. The reaction mixture was continuously fed into a storage tank wherein the reaction mixture was allowed to cool to ambient temperature. Apart from the preheating of the polyol and the polyisocyanate no other heating or no cooling devices were employed. About 500 Kg of prepolymer was prepared. After 3 hours in the storage tank the prepolymer had an NCO value of 6.37% by weight at room temperature. After 5 days the viscosity of the prepolymer was 6300 mPa.s.

One day after the prepolymer was made a flexible foam was made continuously on the same machine by feeding the following ingredients via four different feeds to the mixing head: the prepolymer made above 90 parts by weight (pbw), polymeric MDI of NCO value of 30.6 (10 pbw), water (1.9 pbw) and a composition comprising the commercially available catalysts Niax Al (0.27 pbw) and Dabco 33LV (0.4 pbw). The flexible foam had the following properties: density:43 Kg/m$^3$; hardness-indentation load deflection 40% (ISO 2439B):144; hardness-compressive force deflection 40% (ISO 3386):3.1; resilience (%, ball rebound—ASTM D-3574):50; tear strength (N/m, ASTM D-3574):219; tensile strength (kPa, ISO-1798):117; elongation (%, ISO-1798):160; and compression set 75% (%, ISO-18568):6.2.

EXAMPLE 2

Example 1 was repeated with the following changes:
Machine:Secmer R 280
Prepolymer preparation:
  glycerol initiated polyol of OH value of 32 and 13% EO tipping
  polyol feeding speed:20.76 Kg/min.
  polyisocyanate feeding speed:6.90 Kg/min.
  polyol preheated at 45° C.
  polyisocyanate preheated at 50° C.
  mixer speed:4
  after one day the prepolymer obtained has a viscosity at room temperature of 7000 mPa.s and an NCO value of 5.8% by weight.
Flexible foam:
  a foam was made in a cup by combining and mixing 122 pbw of a composition comprising the above prepolymer and the polymeric MDI used in Example 1 in a weight ratio of 4:1; 3 pbw of water and 0.6 pbw of a composition comprising Niax Al and Dabco 33LV in a weight ratio of 1:2. The foam has a density of 29 Kg/m$^3$.

We claim:

1. A continuous process for the preparation of an isocyanate-terminated prepolymer having an NCO content in the range from 2 to 15% by weight, said process comprising the steps of:
   (A) continuously delivering to a reaction zone an organic polyisocyanate composition selected from the group consisting of aliphatic, cycloaliphatic, araliphatic and aromatic polyisocyanates and an isocyanate reactive compound having an average molecular weight of at least 1000 selected from the group consisting of polyols, thiols, polyamines, imino-compounds, enamine-containing compounds and mixtures thereof, the relative proportions of isocyanate composition and isocyanate reactive compound being appropriate for the formation of a prepolymer having an NCO content in the indicated range;
   (B) allowing the isocyanate composition and the isocyanate reactive compound to react in the reaction zone to form an isocyanate-terminated prepolymer; and
   (C) continuously removing the prepolymer from the reaction zone.

2. A process according to claim 1 wherein the isocyanate reactive compound has an average nominal functionality of 2 to 3 and a molecular weight of 2000–8000.

3. A process according to claims 1 or 2 wherein no heat is applied to the prepolymer-forming reactants or reaction mixture other than to liquify solid reactants.

4. A method for the production of flexible foams comprising the steps of:
   (A) continuously delivering to a reaction zone an organic polyisocyanate composition selected from the group consisting of aliphatic, cycloaliphatic, araliphatic, and aromatic polyisocyanates and an isocyanate-reactive compound having an average molecular weight of at least 1000 selected from the group consisting of polyols, thiols, polyamines, imino-compounds, enamine-containing compounds and mixtures thereof, and optionally a catalyst, the relative proportions of isocyanate composition and isocyanate reactive compound being appropriate for the formation of a prepolymer having an NCO content in the range from 2 to 15% by weight;
   (B) allowing the isocyanate composition and the isocyanate reactive compound to react in the reaction zone to form an isocyanate-terminated prepolymer;
   (C) continuously removing the prepolymer from the reaction zone;
   (D) delivering the prepolymer to a foam-forming zone;
   (E) reacting the prepolymer in the foam-forming zone with an isocyanate-reactive component and;
   (F) recovering the foam so formed.

5. A method according to claim 4 wherein the isocyanate reactive component comprises at least 40% by weight of water, the rest of it being chain extenders, crosslinkers, conventional additives and less than 5% by weight of a conventional polyol used for the formation of polyurethane foams.

6. A method according to claim 4 wherein the isocyanate reactive component comprises at least 95% by weight of water.

7. A method according to claim 4 wherein the foam-forming reaction mixture is substantially free of halocarbon blowing agent.

8. A method according to claim 4 wherein a second isocyanate composition is delivered to the foam-forming zone in addition to the prepolymer.

9. A method according to claim 8 wherein the second isocyanate composition has an NCO content of at least 25% by weight.

10. A method according to claim 8 wherein the second isocyanate composition is delivered to the foam-forming zone independently from the prepolymer.

11. A method according to claim 4 wherein the prepolymer is prepared from a diphenylmethane diisocyanate composition and is used in conjunction with a second diphenylmethane diisocyanate composition having a NCO content of at least 25% by weight, the weight ratio of prepolymer to second MDI composition being in the range from 2.3:1 to 100:1, the prepolymer and second MDI composition together containing from 20 to 40% by weight of methylene-bridged polyphenyl polyisocyanates or reacted residues thereof and from 80 to 60% by weight of reacted residues of isocyanate-reactive species, the isocyanate reactive component comprising at least 95% by weight of water, and the weight ratio of prepolymer and second MDI species to aqueous isocyanate-reactive component being in the range from 100:10 to 100:1.

12. A method according to claim 4 wherein the reaction zone to form the isocyanate-terminated prepolymer is also used as the foam-forming zone.

13. A method according to claim 4 wherein the steps (D), (E) and (F) are being carried out continuously.

14. A method according to claim 13 wherein the prepolymer is continuously transferred from the reaction zone to the foam-forming zone.

* * * * *